United States Patent [19]

Keiser

[11] 4,032,821

[45] June 28, 1977

[54] UTILITY DISTRIBUTION CONSOLE

[75] Inventor: William Keiser, St. Louis, Mo.

[73] Assignee: McGraw-Edison Company, Elgin, Ill.

[22] Filed: Apr. 2, 1976

[21] Appl. No.: 673,065

[52] U.S. Cl. .............................. 361/334; 174/48; 137/360; 285/137 R

[51] Int. Cl.² ........................................ H02B 1/06

[58] Field of Search ............ 317/99, 112, 119, 104, 317/120, 122; 174/47–49, 97; 52/220, 221; 137/360; 285/137 R

[56] References Cited

UNITED STATES PATENTS

| 3,377,756 | 4/1968 | Polhamus | 52/220 |
|---|---|---|---|
| 3,692,920 | 9/1972 | Santarelli | 174/48 |
| 3,921,345 | 11/1975 | Damico | 174/49 |
| 3,992,565 | 11/1976 | Gatfield | 174/15 WF |

Primary Examiner—Gerald P. Tolin
Attorney, Agent, or Firm—Charles F. Lind

[57] ABSTRACT

This invention teaches a prefabricated console for distributing various utilities from generally common locations to a plurality of selected spaced locations, where separate connections can then be made as required, of any individual utility with the separate pieces of equipment using the particular utility. The disclosed console device has frame structure that houses and separately isolates the various non-compatible utilities from one another in separated compartments or chases. Thus, the electrical distribution is located in one compartment or chase and utilities including specifically hot and cold water, steam, gas or other combustible fuel, are housed in another compartment or chase separated or isolated from the electrical chase. Further, the electrical distribution includes a master fuse or breaker control box located in a single control panel and separate terminals or outlets are provided at spaced locations along the console. Likewise, separate takeoffs or taps having suitable control valves and suitable disconnects at each takeoff are provided for the other utilities at locations along the console.

1 Claim, 6 Drawing Figures

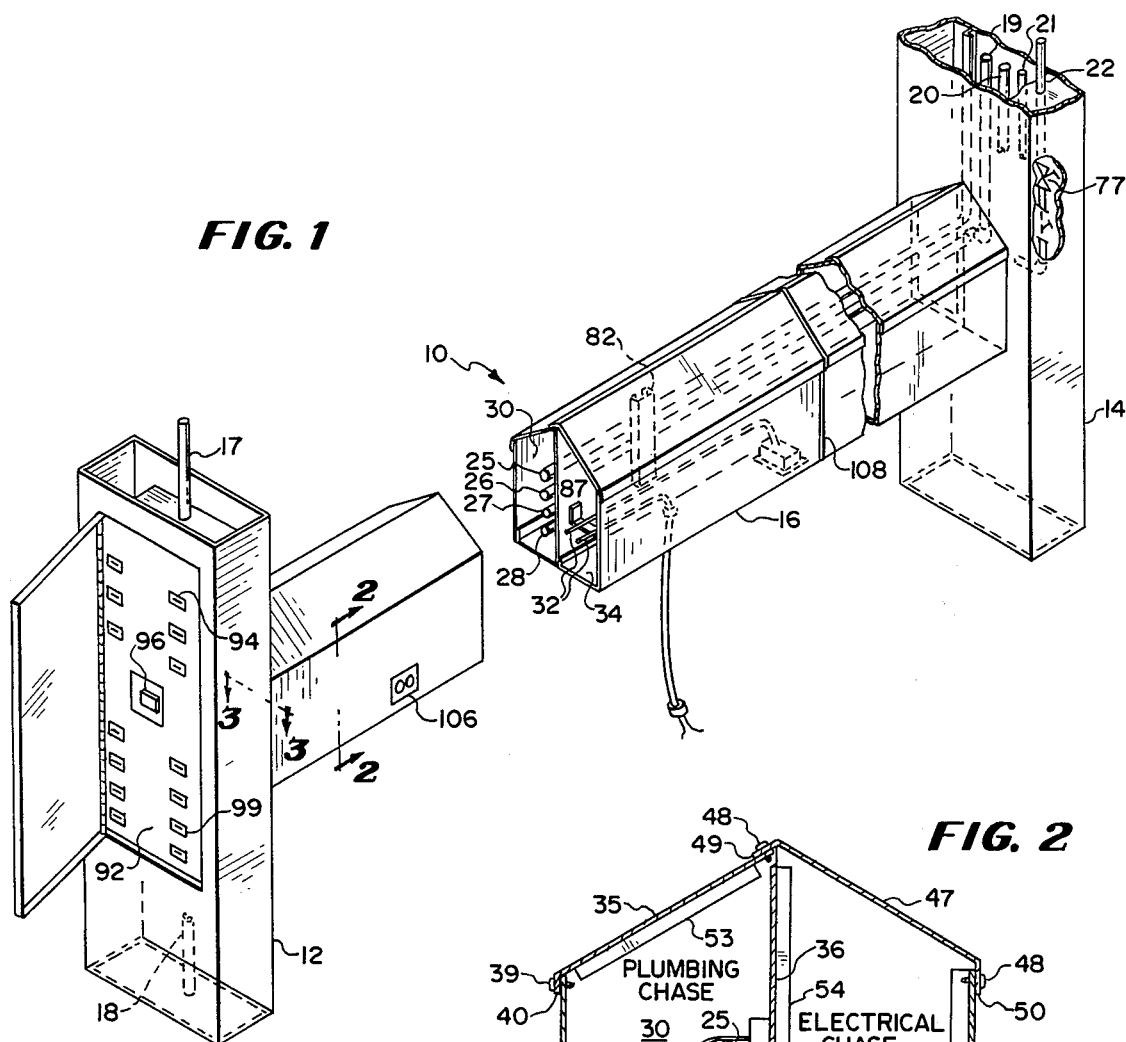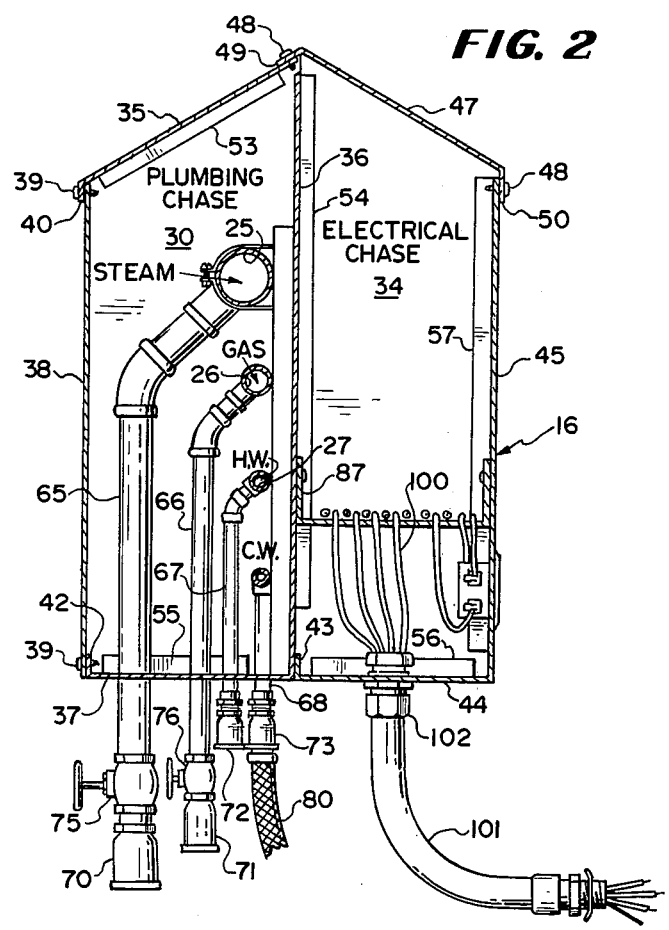

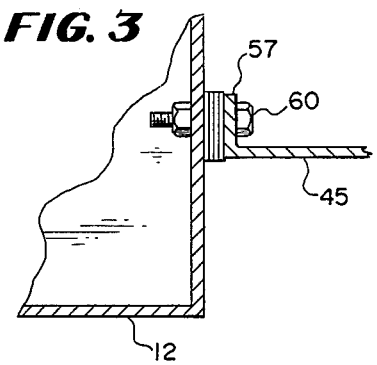
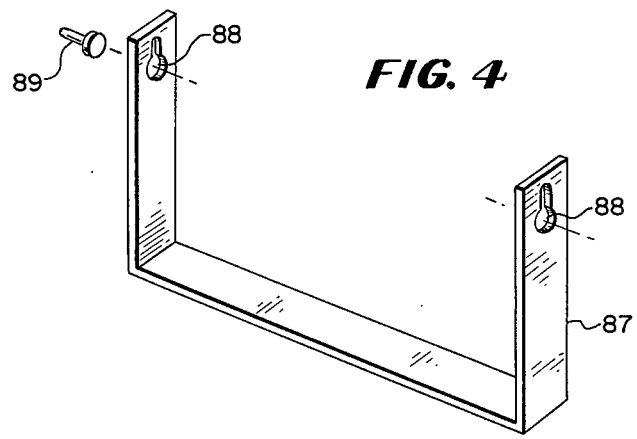
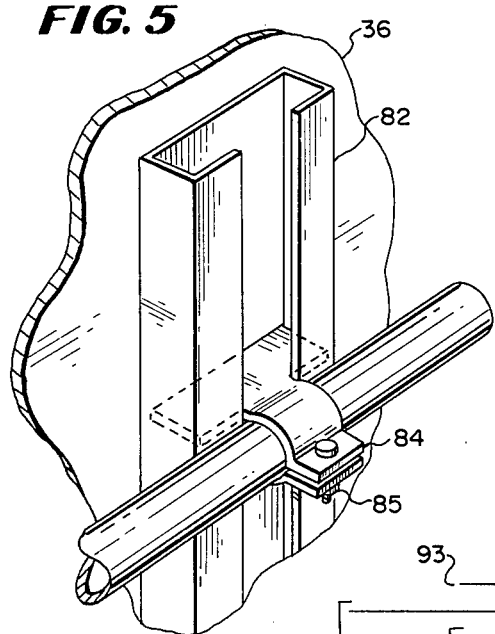
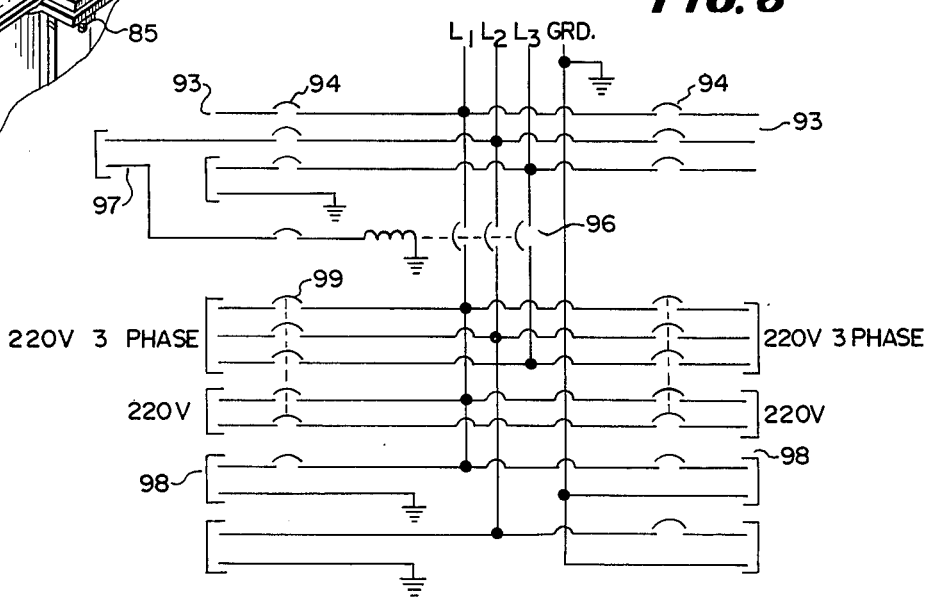

UTILITY DISTRIBUTION CONSOLE

BACKGROUND OF THE INVENTION

In the food service industry, a major cost in the installation of the facility is the distribution of utilties. In other words, a typical food preparing and serving installation would require utility distribution such as hot and cold water lines, stream lines, drains, gas lines, and electrical lines connected to some or all of the equipment used in the kitchen. The layout of the kitchen would dictate that certain of these utilities are brought to particular locations for servicing a particular piece of equipment. Utility distribution piping or wires most commonly are buried in the walls and the floors of the building until the same are adjacent the particular equipment that would be using the utility, and then are exposed the final few feet to the actual connection with the equipment. Since the installation of the distribution means for many of the utilities is performed by different building trades, total local on-site installation of the utilities is costly and frequently time consuming. Moreover, any relocation of the buried distribution means for the utilities is difficult and costly should it be desired to rearrange the equipment.

It is possible with a typical prearranged layout of such equipment, which might include ranges, deep fat fryers, ovens, cookers, dishwashers, mixers, refrigerators, freezers or the like, to provide also a prearranged layout for distribution of the utilities needed for such an installation. With the goal, prefabricated consoles have been made to carry utilities to the general vicinity of the equipment, where only two in-the-field connections for each such utility are needed, namely one from the source to the console and the other from the console to the equipment. However, the overall effectiveness of such known consoles has been lacking, particularly insofar as the handling. control, and safety of the electrical power.

Various patents which illustrate devices related to that which is disclosed herein are as follows: Carvor U.S. Pat. No. 2,951,498 entitled PORTABLE PLUMBING AND ELECTRICAL UNIT FOR MULTIPLE INSTALLATION OF WASHING MACHINES; Nelson et al. U.S. Pat. No. 2,992,438 entitled MULTI-STATION SURFACE MOUNTING PLUMBING FIXTURES; Dybeck U.S. Pat. No. 3,110,723 entitled DISTRIBUTION PLANTS FOR THE SUPPLY OF POWER MEDIA; Meyer U.S. Pat. No. 3,461,319 entitled CONSOLE; and the Tindal U.S. Pat. No. 3,670,764 entitled BUILDING UTILITY AND SERVICE SYSTEM.

SUMMARY OF THE INVENTION

This invention teaches a modular distribution and control system for utilities, such as hot and cold water, steam, electrical power, natural gas or other fluid fuel, and waste drain facilities.

The disclosed system includes separate prefabricated modulars each structurally defining separated compartments containing specific pipes, conduits or electric wires which are connected together on the site to the desired console. The console included an elongated beam that is connected at its opposite end to vertical risers or headers, and each provides isolated tubular housing walls for enclosing the utility distribution piping or wires. Further specific outlets for each utility are located at specific horizontally spaced locations along the beam, as might be desired for connection to the individual pieces of equipment that might use the utility. Specific connections can be made on the site for each utility to the console, and further ready disconnect attachments or fittings on the console provide with the use of flexible conduits or other transmission means for in-the-field connection between the console and the particular piece of equipment.

The electrical utility lines are separated by wall structure from the other utilities and thus presents a safe system within the standards of most building codes and listing agencies such as Underwriter's Laboratories or the like. The electrical distribution arrangement further includes a master fuse or breaker control box located in a single control panel to give total control over all the separate circuits used to connect with the isolated terminals or outlets provided at spaced locations along the console.

BRIEF DESCRIPTION OF THE DRAWINGS

FIG. 1 is a perspective view illustrating a preferred embodiment of the subject utility distribution console;

FIGS. 2 and 3 are enlarged sectional views of the console as seen generally from lines 2-2 and 3-3, respectively;

FIG. 4 is a perspective view of a hanger used in the console for supporting the electrical wires contained therein;

FIG. 5 is a perspective view of a hanger used in the console for supporting the distribution pipes contained therein; and FIG. 6 is a schematic illustration of the typical preferred electrical circuitry utilized in the subject console.

DETAILED DESCRIPTION OF THE INVENTION

In FIG. 1, console unit 10 is illustrated as having a pair of separate end risers 12 and 14 and a horizontal beam section 16 connected or supported between the risers. In the embodiment illustrated, riser 12 houses the electrical utilities, and the opposite riser 14 encloses and houses the plumbing type utilities which might include the separate lines for gas, steam, hot water, and cold water, each of which is illustrated by a specific pipe.

The input connection of the utility to the riser typically would be either through stubs from the floor or from below the riser, or from the ceiling or above the unit; but it also could be from one side of the unit. The in-the-field conditions as to the building construction, floor layout, etc. determines which is used. Regardless, only a single connection from the utility distribution pipe or line associated with the building is needed to connect each utility to or with the console.

A single conduit 17 for the electrical utility is illustrated leading through the top wall of the electrical riser 12, although a bottom inlet conduit 18 is illustrated in phantom as to the optional hook-up. Likewise, the steam pipe 19 is illustrated coming from above plumbing riser 14, as in gas pipe 20, hot water pipe 21, and cold water pipe 22, through the top wall of the riser.

The risers and beam are each tubular and thus completely enclose the piping or wires contained therein. Further, each is structural and in fact the beam is connected to and suspended between the opposite risers. The beam section further is separated into at least two compartments or chases that extend the length of the beam, where each compartment is used to carry the compatible utilities and maintain them separated from non-compatible utilities carried in the other compartment. As such, the plumbing type utilities having the steam line 25, gas line 26, hot water line 27, and cold water line 28 are maintained in the plumbing chase or compartment 30; while the electrical conductors or lines 32 are maintained in the chase or compartment 34 isolated from the plumbing compartment 30.

Referring specifically to FIG. 2, the beam section 16 of the console is noted to include the plumbing section or chase 30 and the electrical section or chase 34, as noted. The preferred construction of the beam utilized a continuous single piece of sheet metal creased to form the top wall 35, a common medial wall 36, and the bottom wall 37 for the plumbing compartment as illustrated, while a removable panel 38 connected by screws 39 to appropriately aligned flanges 40 and 42 from the corresponding top wall and bottom wall respectively enclose the defined compartment. The electrical compartment 34 is formed by a single piece of sheet metal connected by flange 43 to the common medial wall 30, as by welding or the like, and being creased to provide the bottom wall 44 and side wall 45, and lastly by a removable cover panel 47 being secured by screws 48 through flange 49 and 50 overlying the adjacent wall structures.

Suitable inwardly turned flanges 53, 54, 55, 56, and 57 formed from the respective main walls of the beam provide for the removable connection of the beam to the adjacent riser, by means of the separate bolt and nut devices 60 (FIG. 3). The plumbing compartment 30 and the riser 14 are provided with aligned opening means for allowing the interfeed of the appropriate pipes from the riser section to within the plumbing section of the beam. In like manner, the electrical compartment 34 and the adjacent riser 12 are provided with aligned opening means. Preferably consisting of electrical conduit nipples with insulating bushings, which allows the interfeed of electrical lines from the electrical riser 12 to the electrical compartment of the beam. The opposite ends of the plumbing and electrical compartments respectively adjacent the risers 12 and 14 are closed and thereby maintains the beam compartment isolated from the nonrelated riser compartment.

As illustrated in the drawing, there is a separate main monifold-type pipe extending the length of the beam for each of the utilities. The construction or beam arrangement illustrated shows the steam pipe 25, gas pipe 26, hot water pipe 27, and a cold water pipe 28. As illustrated, each can have selected take-offs from the main pipe by means of standard fittings and the like from the main pipe or manifold section to form the vertically depending sections 65, 66, 67, and 68 respectively for the various utilities. It is understood that the riser pipe would extend through the bottom wall 37 of the plumbing compartment and be provided at its exposed end with a quick-connect coupling or fitting. The respective fittings 70, 71, 72 and 73 are illustrated, for example, as being of the quick-connect type for all of the utilities although other type couplings can be used. The lines further can have on-off valves associated therewith where there would be the option of disconnecting the exterior in-the-field line from the main manifold lines, and it is noted that valves 75 and 76 are illustrated respectively for the steam and for the gas lines adjacent the disconnect fittings. Valving can likewise be located in the plumbing riser 14, as illustrates at 77 on the cold water line to provide a centralized control.

Further, the cold water is shown to have a connected flexible hosing so which is used to connect the particular utility to the piece of equipment on site; and like on site suitable connections can be made for distribution of the other utilities to the place of equipment.

As illustrated, the plumbing compartment 30 has a plurality of channels 82 welded or otherwise secured to the medial wall 30, where the same accepts a T-shaped and pieces on clamp means 84. A pair of like clamp pieces can be thereby fitted into the channel 82 and held together in embracing fashion around a pipe by means of a nut and bolt arrangement 85, where the drawing up tightly of the nut prevents sliding movement of the clamp relative to the channel and the pipe relative to the clamp.

In like manner, a plurality of C-shaped brackets 87 are used at spaced locations along the length of the beam to support the cables or wires in the electrical chase. The brackets 87 each having key hole slots 88 at the upper ends of the side arms thereon and are releasably hung from enlarged headed studs 89 welded or othewise secured at their narrow ends to the adjacent side wall of the electrical compartment section.

It will be understood that any number of separate T-connections can be made off of the main manifolds of the particular plumbing utility and communicated to outside the plumbing compartment as illustrated in FIG. 2 at spaced prearranged locations along the length of the beam for ready in-the-field connection of the utility with minimum on-the-nite fabrication of piping or the like.

The electrical riser 12 has a panel 92 which has mounted thereon an appropriate number of circuit breakers of conventional construction and the same is schematically illustrated in FIG. 6. In the preferred embodiment of the subject invention, the lines L1, L2, L3, and ground, for a three-phase system, are brought by the conduit is as noted, to the interior of the riser compartment 12 and connected to bus bare, for example, of the breaker. Separate circuits 93 from these hot lines are then connected across appropriate circuit breakers 84 and then via the electric wires 32 from the electrical riser compartment down the electrical beam compartment to the point they are to be tapped off and be used.

A typical preferred embodiment is further illustrated as having an automatic main disconnect or shunt trip breaker at 96 which might be connected, for example, in a fire detection control circuit 97, so that should a fire occur, all of the power below a certain point in the circuit box would be automatically disconnected: whereas the circuits located above this would not be. Thus it would be possible to deenergize the cooking equipment that might generate heat, for example: whereas the light circuits would preferably remain energized even in the event of a fire.

The hot lines located below the shunt trip breaker 96 are at the same potential, when this breaker is closed, as the input lines L1, L2, and L3 noted above, and again appropriate circuits 98 across suitable circuit breakers 99 can be utilized to provide three-phase circuitry to suitable output devices (not shown) and a single-phase circuitry both of 220 volts or the like potential, and the typical 110 volts.

The appropriate pairing off of the actual electrical lines themselves is possible as illustrated in FIG. 2 by the four lines 100 which extend through an outlet conduit 101 connected as its one end by conduit fittings 102 to the bottom wall of the electrical chase or compartment. Alternately, the individual wires 104 of the electrical chase section or compartment might be connected to an appropriate juncture box 105 to provide exposed receptical 105 on the side of the beam, which would again constitute a single electrical circuit. These circuits could be prewired from the circuit breaker side of the panel to the receptical by the manufacturer of the console itself.

The beam 16 is shown to have a field joint or connection 108, and this can be similarly defined by paired inturned flanges and an appropriate suitable bolt connection, as was noted between the risers and beam itself. Appropriate snaling compound or gaskets might be interposed between the adjacent faces of the connection to make the same moro dust or fluid tight. The beam thus can be broken down into convenient lengths for case of handling, and separate field joints of the beam sections made as needed. The actual plumbing fixtures would be provided with unions to allow the separable connections of the adjacent ends of the pipes while yet maintaining a unitary or continuous manifold. The electrical lines can likewise have separable connections at each field joint; or the individual wires needed for the separate electric circuits that crown a field joint could be laid in the field. This is yet quite easy since they are merely supported over the hangers 87 in the run between the appropriate receptical box or conduit and the control panel. The electric wires themselves are obviously electrically insulated from one another, although they need not be in a protective shoaths or the like since they are isolated both mechanically and electrically be means of the console walls.

As shown, the removable panels 38 and 47 of the plumbing and electrical chance allow the installer of the equipment clear accons to all of the components in the chase, while the same can again be isolated from all of the ajacent structure by enclosing the panel and securing it in place with the provided screws.

It is noted therefore, that the disclosed console allows for the ready factory fabrication of the appropriate beam and riser sections, including all appropriate conduits and/or recepticals used with the electrical chase, and all take-offs from the plumbing chase. Moreover, the common control panel 92 and the prewiring of circuits therefrom allow for the ready installation and accessibility of the electrical wires in the field, and from a single access location at the panel.

What is claimed is:

1. A utility distribution console, comprising the combination of a pair of tubular risers, a tubular beam and means connecting the beam at its ends to and between the spaced risers; said risers each having interconnected wall structure defining at least one vertically oriented enclosed compartment and said beam having interconnected wall structure defining at least two horizontally oriented enclosed compartments, and said wall structure having openings interconnecting one compartment of the beam with the compartment of one riser and interconnecting the other compartment of the beam with the compartment of the other riser; utility transmission means in each riser compartment and the corresponding beam compartment, means providing exposed outlet connections at selected locations spaced along the beam for each of the utility transmission means, means for providing in-the-field connections of the utility to each riser utility transmission means, a control panel in one of the risers and a plurality of control elements in the panel, and means routing the utility transmission means in a series connection through the control elements in the panel and only then to the selected beam output connections respectively, to provide centralized control of the corresponding utility for all of said beam output connections at the control panel.

* * * * *